United States Patent [19]

Brubaker

[11] 4,178,208
[45] Dec. 11, 1979

[54] SELF LOCKING DRIVE SYSTEM FOR ROTATING PLUG OF A NUCLEAR REACTOR

[75] Inventor: James E. Brubaker, Pittsburgh, Pa.

[73] Assignee: The United States of America as represented by the United States Department of Energy, Washington, D.C.

[21] Appl. No.: 880,679

[22] Filed: Feb. 23, 1978

[51] Int. Cl.² .................... G21C 19/20; F16H 1/16; B66C 17/08
[52] U.S. Cl. .................................. 176/30; 74/425; 176/87; 214/18 N
[58] Field of Search ............... 176/30, 87; 214/18 N; 294/86 A; 70/190; 74/325, 425, 426, 427, 724, 458

[56] References Cited

U.S. PATENT DOCUMENTS

| 2,422,343 | 6/1947 | Duer | 74/724 |
| 3,143,226 | 8/1964 | Cagin | 176/30 |
| 3,252,349 | 5/1966 | Widdrington | 74/427 |
| 3,990,942 | 11/1976 | Costes | 176/30 |
| 4,047,449 | 9/1977 | Popov | 74/458 |

Primary Examiner—Samuel W. Engle
Assistant Examiner—Donald P. Walsh
Attorney, Agent, or Firm—R. V. Lupo; Frank H. Jackson

[57] ABSTRACT

This disclosure describes a self locking drive system for rotating the plugs on the head of a nuclear reactor which is able to restrain plug motion if a seismic event should occur during reactor refueling. A servomotor is engaged via a gear train and a bull gear to the plug. Connected to the gear train is a feedback control system which allows the motor to rotate the plug to predetermined locations for refueling of the reactor. The gear train contains a self locking double enveloping worm gear set. The worm gear set is utilized for its self locking nature to prevent unwanted rotation of the plugs as the result of an earthquake. The double enveloping type is used because its unique contour spreads the load across several teeth providing added strength and allowing the use of a conventional size worm.

4 Claims, 5 Drawing Figures

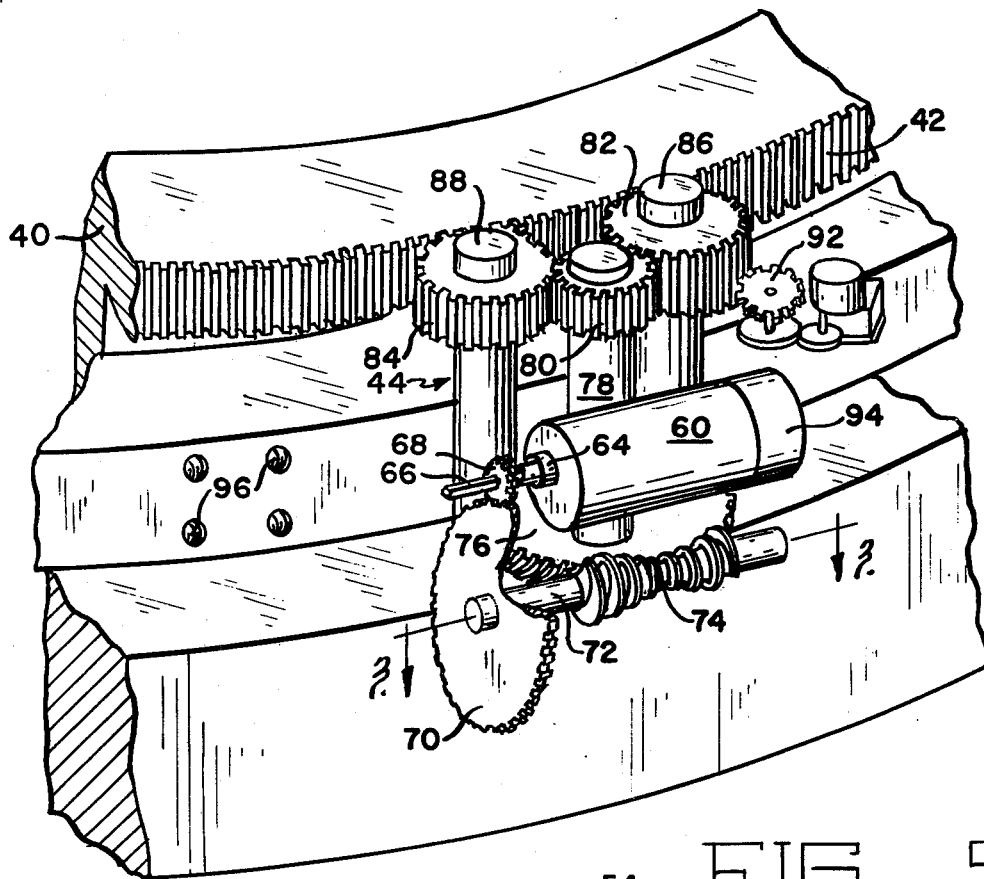
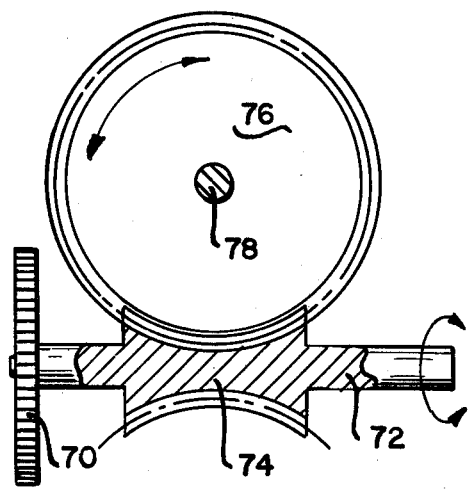
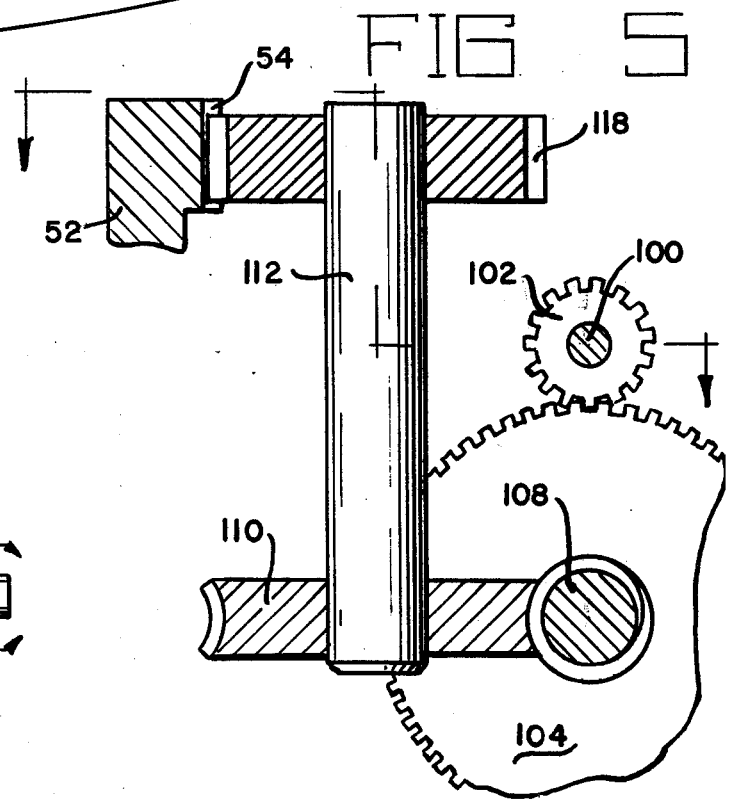

SELF LOCKING DRIVE SYSTEM FOR ROTATING PLUG OF A NUCLEAR REACTOR

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a self locking drive system for rotating the plugs on the head of a nuclear reactor which is able to restrain plug motion if a seismic event should occur during reactor refueling.

Due to the highly radioactive nature of the fuels used in nuclear reactors, it is essential to conduct all fuel handling operations to preclude accidents which would release radioactive materials into the atmosphere. One natural force which must be seriously considered when designing a reactor is the possibility of an earthquake.

In several Liquid Metal Fast Breeder Reactors such as Clinch River Breeder Reactor Plant (CRBRP), large eccentric rotating plugs are employed to permit refueling through holes in the head of the reactor core. Since uncontrolled rotation of the plugs during refueling could rupture fuel assemblies which contain radioactive fuels and render the reactor inoperative for an indefinite period of time, a self locking device is necessary to prevent unwanted plug rotation. It is noted that massive eccentric components mounted on the plugs create large torques when subject to possible horizontal seismic accelerations. However, drive units that are well known in the art which rotate each plug via a pinion and bull gear are unable to restrain the plug without gear breakage since the seismic torque is an order of magnitude higher than normal drive torque. Since counterbalancing the eccentric load is impractical, some other method to prevent seismic rotation is necessary.

Several possible designs have been formulated for locking the plugs during refueling. One such design which was the original approved design for the CRBRP utilized a "synchronized worm". In this design a D.C. servomotor drives a drive train which is drivingly connected to the plug via a bull gear. The bull gear is integrally attached atop the plug via a riser assembly. Also connected to the drive train is another gear train synchronizing a large worm gear with the bull gear. The purpose of this "synchronized worm" is to prevent rotation of the bull gear due to seismic torque. Normally the worm doesn't touch the bull gear. When a seismic event occurs a shear coupling which is included in the normal drive train breaks. This disconnects the normal drive train allowing it to freewheel without damaging the gears, and causes the worm to engage the bull gear thus taking the high seismic torque and locking the bull gear.

However, use of this design creates many problems. The bull gear must have helical rather than spur type teeth. Not only would it be extremely difficult to manufacture a worm gear which is large enough to engage the bull gear but the worm to helix conformity would be poor. Further, it would be difficult to properly synchronize the drive train which is connected to the bull gear and the drive train which is connected to the worm gear. For these reasons this original design for use on the CRBRP was abandoned.

It is an object of the present invention to provide a self locking drive system for rotating the plugs on the head of a nuclear reactor.

It is a further object of this invention to provide a drive system which is able to withstand torque resulting from a seismic occurrence.

SUMMARY OF THE INVENTION

A self locking drive system is disclosed for rotating the plugs on the head of a nuclear reactor which is able to restrain plug motion if a seismic event should occur during reactor refueling. A servomotor is connected via a gear train and a bull gear to the plug. The gear train contains a self locking double enveloping worm gear set which consists of a matching worm gear and a worm. Self locking is defined as being capable of transmitting torque produced by the D.C. servomotor while resisting seismic torque generated by the rotating plugs. The double enveloping worm gear set is utilized for its strength and self locking nature to prevent unwanted rotation of the plugs as the result of an earthquake. It is also used because the unique contour of the double enveloping worm gear set spreads the load across several teeth and allows the use of a smaller more conventional size worm.

The drive train also contains gear means to drivingly engage the bull gear to the worm gear. Several different combinations of elements are possible for this gear means depending on the mass of the plug being driven. For a small size plug as the small rotating plug on the CRBRP the gear means can consist of a pinion gear drivingly intermeshed with the bull gear, and a shaft which drivingly connects the pinion gear and the worm gear. For larger size plugs as the intermediate and large rotating plug for the CRBRP the gear means can consist of dual idler gears drivingly engaged to the bull gear and a pinion gear. The pinion gear is then drivingly connected via a shaft to the worm gear.

Finally the drive train contains means for driving the worm. These means contain a D.C. servomotor and a slip clutch which is coupled to the D.C. servomotor to provide overtorque protection for the gear train.

Plug rotation is controlled by a refueling control system. Positive feedback information is provided by an encoder which is engaged with a gear in the drive train located near the bull gear and a tachometer which is mounted on the D.C. servomotor. This information is fed into a computer in the Refueling Control System and is used to control power amplifiers which provide the power to the DC servomotor and therefore drive and control the acceleration and positioning of the plugs.

BRIEF DESCRIPTION OF THE DRAWINGS

The present invention is illustrated in the accompanying drawings wherein:

FIG. 2 is a fragmentary, partly broken away perspective view of the drive system for the intermediate rotating plug thereof, with the housing being removed for clarity.

FIG. 3 is a schematic view of a section taken in the direction of the arrows 3—3 in FIG. 2 showing the double enveloping worm gear set.

FIG. 5 is a section taken in the direction of the arrows 5—5 in FIG. 4.

DETAILED DESCRIPTION OF THE INVENTION

This invention is illustrated by its application to the Clinch River Breeder Reactor Plant (CRBRP). The self locking drive system for rotating the plugs which is the subject matter of this invention is expected to be utilized in this experimental breeder reactor facility. An analysis of how the drive system is incorporated into the CRBRP will be used to give a detailed disclosure of the invention although the invention can be used on any reactor with rotating plugs.

Figure 1:
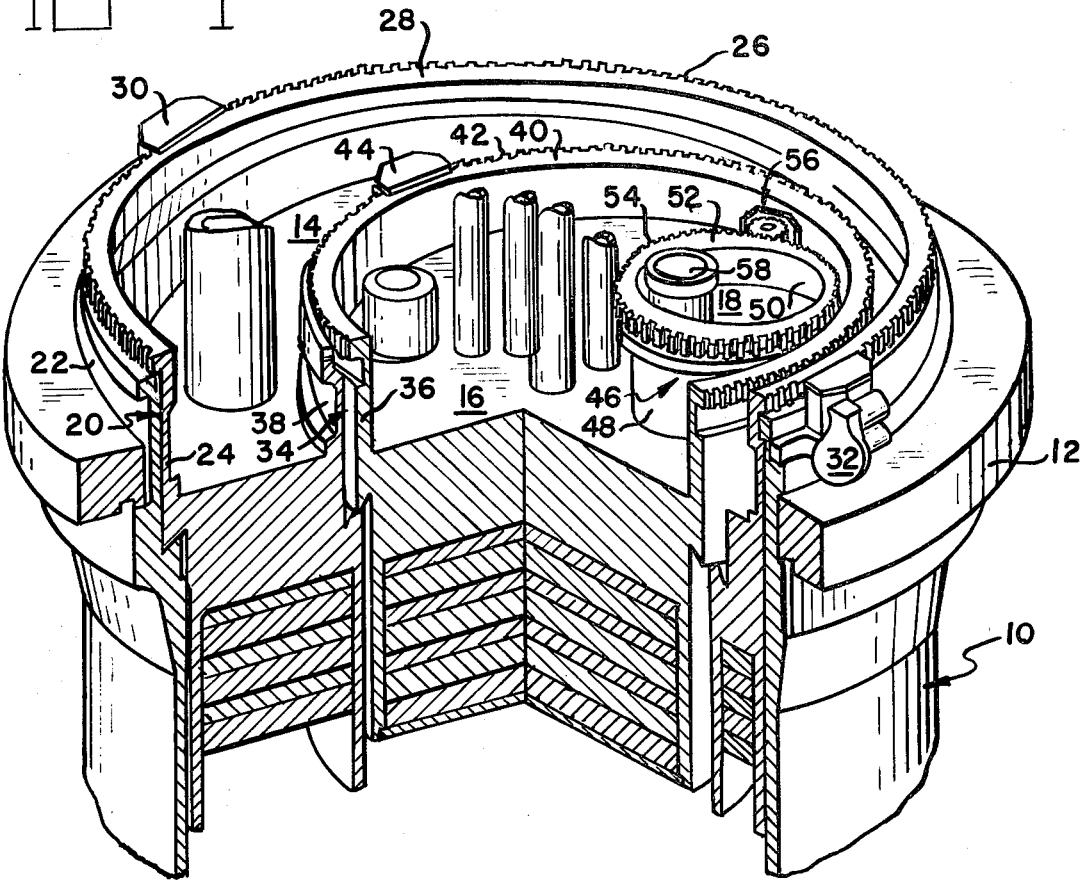
FIG. 1 is a partly broken away perspective view of the top portion of a large power reactor.

Referring to FIG. 1, there is shown the top portion of the reactor for the CRBRP. The reactor vessel 10 is closed at its top by a closure head comprising a stationary outer ring 12, a large rotatable plug (LRP) 14, an intermediate rotatable plug (IRP) 16, and a small rotatable plug (SRP) 18. The stationary outer ring 12 may be attached to the reactor vessel by bolts or other suitable means known in the art. The LRP 14 is rotatably supported from the stationary outer ring 12 by an LRP riser assembly 20.

The LRP riser assembly 20 comprises an outer riser 22, which is secured about the inner edge of the stationary outer ring 12, rotatively coupled to an inner riser 24, which is secured about the outer edge of the LRP 14, via bearings and seals (not shown). A bull gear 26 is integrally attached about the outer edge of a ring 28 which in turn is secured perpendicularly to the top surface of the inner riser 24. Two LRP drive systems 30 and 32 which are bolted 180° apart about the outer edge of the outer riser 22 are drivingly intermeshed with the bull gear 26. This design enables the LRP 14, driven by the LRP driven systems 30 and 32 to rotate relative to the stationary outer ring 12 while maintaining a fluid-tight boundary between the outside and inside of the reactor vessel 10. The IRP 16 is disposed eccentrically within the LRP 14 and rotatably supported from the LRP 14 by the IRP riser assembly 34. Similar to the LRP riser assembly 20, the IRP riser assembly 34 comprises an inner riser 36, an outer riser 38, a ring 40 and a bull gear 42. However, there is only one drive system, the IRP drive system 44 which is bolted to the outer edge of the outer riser 38 and drivingly intermeshed with the IRP bull gear 42 to rotate the IRP 16.

The SRP 18 is disposed eccentrically within the IRP 16 and rotatably supported from the IRP 16 by the SRP riser assembly 46. Similar to the LRP riser assembly 20 and the IRP riser assembly 34 the SRP riser assembly 46 comprises an outer riser 48, an inner riser 50, a ring 52 and a bull gear 54. Further the SRP drive system 56, which is shown without its top gear cover, is bolted to the outer edge of the outer riser 48 and drivingly intermeshes with the bull gear 54 to rotate the SRP 18.

The SRP 18 also has disposed therein an in-vessel transfer collar 58 which provides access for an in-vessel transfer machine (not shown). During refueling, an in-vessel transfer machine which may be chosen from those well known in the art, is placed in the bore of the in-vessel transfer collar 58. When the in-vessel transfer machine is in place in the in-vessel transfer collar 58, selected combination of rotations of the three rotatable plugs 14, 16, and 18 will align the in-vessel transfer machine in appropriate relationship with a chosen fuel assembly of the core (not shown). As well known in the art, the in-vessel transfer machine may then remove the chosen fuel assembly from the core and replace it with a fresh fuel assembly.

Turning to FIG. 2 there is shown the IRP drive system 44. The IRP drive system cotains a D.C. servomotor 60 and a drive train which drivingly engage the bull gear 42 and rotate the IRP 16 (see FIG. 1).

Mounted on the drive shaft (not shown) of a D.C. servomotor 60 is a slip clutch 64 which is provided for overload protection. Secured to the slip clutch 64 is a drive shaft 66 which has mounted to it a spur type pinion gear 68. A segment of the drive shaft 66 which is rectangular in shape protrudes past the pinion gear 68. In case of electrical failure external mechanical means can be engaged with this segment of the drive shaft 66 to manually drive the gear train and rotate the reactor plugs. The pinion gear 68 intermeshes a spur type reducer gear 70 which is secured to and drives a worm drive shaft 72. Mounted on the worm drive shaft 72 is a cylindrical helical worm 74, formed from a blank having a toroidal portion removed, which intermeshes a disc-shaped helical worm gear 76 which is also formed from a blank having a toroidal portion removed. Together the worm 74 and worm gear 76 form a double enveloping worm gear set whose double enveloping threads have increased total contact area, thus increasing load capacity as compared with a standard worm gear set. A standard worm gear set consists of a worm and worm gear made from blanks without having a toroidal portion removed. FIG. 3 is a planar view taken along line 3—3 of FIG. 2 which is a more detailed diagram of the double enveloping worm gear set. The worm gear 74 is secured to and drives a drive shaft 78 which is skewed to the worm drive shaft 72. Secured to and driven by the drive shaft 78 is a spur type pinion gear 80 which intermeshes two spur type idler gears 82 and 84. The idler gears 82 and 84 are mounted upon shafts 86 and 88 respectively and both intermesh the bull gear 42. The bull gear 42 is integrally attached about the outer edge of a ring 40.

An encoder 92 which is engaged to the idler gear 82 and a tachometer 94 which is mounted on the back of the D.C. servomotor 60 are both connected to a Refueling Control System (not shown in the diagram). The Refueling Control System contains a computer which controls the operations of the IRP drive system 44 and the rotation of the IRP 16 (see FIG. 1).

It is noted that the D.C. servomotor 60 and the gear train are encased in a housing (not shown) which is bolted to the outer riser 38 through threaded holes 96. Also the drive shafts 66, 72, and 78 and shafts 86 and 88 are attached to the housing via bearings which are well known in the art (not shown) such that they are substantially fixed in place but are allowed to rotate.

The elements of the LRP drive system are substantially identical to the elements of the LRP drive system as shown in FIG. 2. The only difference is that, as shown in FIG. 1, a single IRP drive system 44 is bolted to the IRP riser assembly 34 and engages the bull gear 42. In contrast there are two LRP drive systems 30 and 32 which are bolted to the LRP riser assembly 20 and engage the bull gear 26. The two LRP drive systems 30 and 32 are needed to restrain the LRP 14 because, due to its larger mass, it produces a larger seismic torque than does the IRP 16. Therefore two LRP drive systems 30 and 32 are required to restrain the LRP 14 without gear breakage. Its greater weight and diameter also require the increased drive capacity of two servomotors.

Figure 4:
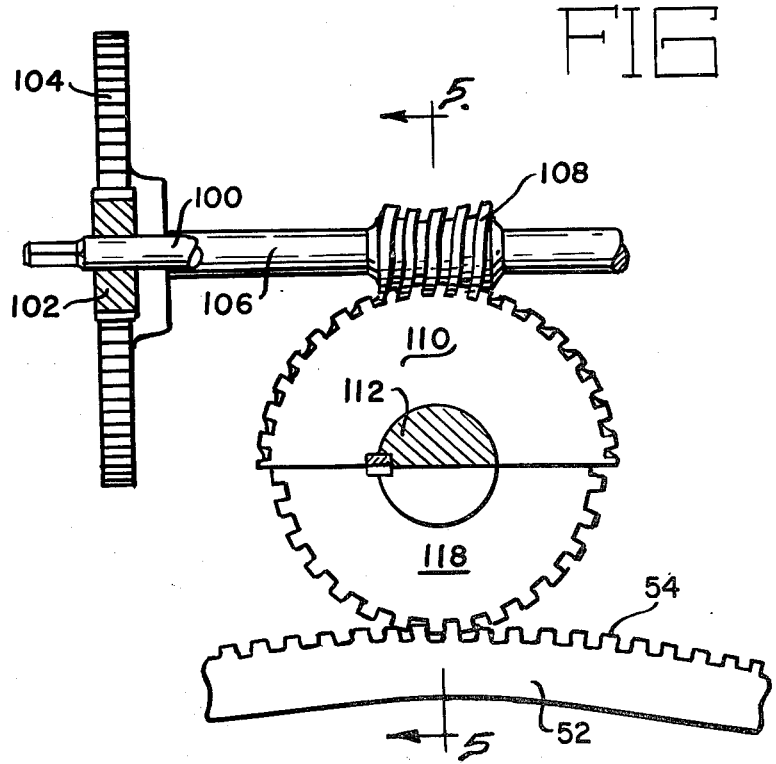
FIG. 4 is a view partly in top plan and partly in section taken in the direction of the arrows 4—4 in FIG. 5 of the drive system for the small rotating plug.

Turning to FIGS. 4 and 5 the SRP drive system will next be described. Many elements of the SRP drive system are functionally equivalent to elements of the IRP and LRP drive systems. Thus drive shaft 100, pinion gear 102, reducer gear 104, worm drive shaft 106, worm 108, worm gear 110 and worm gear drive shaft 112 correspond to similar elements in FIG. 2. Not shown in FIGS. 4 and 5 but required are a servomotor and slip clutch to drive the pinion gear 102 and a tachometer. In the embodiment of FIGS. 4 and 5 drive shaft 112 drives pinion gear 118 which meshes with bull gear 54 which is integrally attached about the outer edge of ring 52 to rotate the Small Reactor Plug.

The major difference between the IRP drive system 44 and the SRP drive system 56 is as follows. The IRP drive system as illustrated in FIG. 2 has two matched idler gears 82 and 84 which are intermeshed between the pinion gear 80 and bull gear 42. In contrast the pinion gear 118 of the SRP drive system as pictured in FIGS. 4 and 5 directly drives the bull gear 54. The reason for this is that the IRP is much more massive than the SRP. Therefore the IRP must be able to withstand a larger seismic torque. While the pinion gear 118 for the SRP is capable of withstanding the possible seismic torque of the SRP, two idler gears are necessary to spread the torque over two sets of bull gears and pinion teeth for the anticipated seismic torque of the IRP.

An encoder (not shown in FIGS. 4 and 5) is also required. This encoder meshes with pinion gear 118 and is driven thereby. Two stops (not shown in the drawings) attached to the outer edge of the inner riser and positioned 180° apart are required for the SRP. These stops are to prevent overtravel of the SRP drive system. It should also be noted that the IRP and LRP each have stops attached to their respective bull gears to prevent overtravel of the IRP drive system and the LRP drive system.

There are several important features of the invention which should be pointed out. The most important of these is the use of the double enveloping worm gear set. The double enveloping worm gear set is used in the primary drive train as disclosed for several reasons.

First the worm gear set is used because of its strong self locking nature of prevent possible rupture of reactor fuel elements when they are being inserted or removed from the reactor core during refueling. Should a fuel element rupture, the reactor system could be contaminated and the reactor shut down for an extended period for cleanup. By selecting an irreversible helix angle (approximately 3° to 15°), the worm will resist seismic rotation of the refueling plug.

The double enveloping worm gear set is located in the primary drive train separated from the bull gear by gear means because it allows the use of conventional size and type of gears. The bull gear needs large gear teeth to withstand seismic forces which are on the order of a magnitude higher than normal dirve torques generated by the D.C. servomotor. To run a worm directly off the bull gear to take advantage of its self locking nature would require a large unconventional worm which is not commercially available and would be difficult to fabricate. It would have poor tooth contact even with helical bull gear teeth. The drive system which is the subject matter of this invention solves this problem by using gear means to transmit the torque from the bull gear to a smaller conventional size double enveloping worm gear set. This smaller size double enveloping worm gear set can be used because the plug torque is drastically reduced by the intervening bull gear to pinion gear ratio. Futher using a double enveloping worm gear set has advantages over using a standard worm gear set. The worm and worm gear of a double enveloping worm gear set are fabricated out of blanks having toroidal portions removed (see FIG. 3). The resulting double enveloping threads have increased total contact area, thus increasing load capacity as compared with a standard worm gear set of equal size.

Finally another advantage of locating the worm gear set in the drive train as disclosed is because the worm gear set blocks the seismic forces from the gears located between the D.C. servomotor and the worm gear set. This allows the use of low torque gears which need only be able to withstand normal dirve torques. It is noted that these gears are also used for speed reduction.

Another feature of the invention is a slip clutch connected between the D.C. motor and the drive train. This slip clutch has the function of providing overtorque protection for the gear train.

Finally another feature of the invention is the manner in which the Refueling Control System and the elements which connect it to the plug drive systems control the rotation of the reactor refueling plugs.

The function of the plug drive is to position the three concentric rotating plugs SRP 18, IRP 16 and LRP 14 (see FIG. 1) so that access can be had through holes in the reactor head to fuel transfer locations located in the core of the reactor. The three plugs under the control of the Refueling Control System simultaneously rotate to a core location so that refueling operations can be performed. Positive feedback information provided by the encoder and the tachometer to a computer in the Refueling Control System is used to control power amplifiers which provide the power to the D.C. servomotor, thereby controlling the acceleration and positioning of the plugs.

The embodiments of the invention in which an exclusive property or privilege is claimed are defined as follows:

1. A self locking drive system for rotating a refueling plug eccentrically mounted on the head of a large fast nuclear reactor, said refueling plug having a bull gear mounted on the edge thereof comprising:
   a self locking double enveloping worm gear set consisting of a worm intermeshed with a matching worm gear,
   a pair of matched idler gears both intermeshing with said bull gear,
   a pinion gear intermeshing with both of said idler gears, said pinion gear and said worm gear being mounted for rotation on the same shaft
   whereby said self locking double enveloping worm gear set prevents unwanted rotation of the refueling plugs as the result of seismic forces caused by an earthquake.

2. A closure head for a nuclear reactor comprising:
   a stationary ring,
   a large rotating plug disposed eccentrically within said stationary ring and rotatably supported from said stationary ring,
   said large rotating plug being rotated by a pair of self locking drive systems as claimed in claim 1, said self locking drive systems being drivingly engaged at substantially opposite ends of the outer edge of said large rotating plug, an intermediate rotating plug disposed eccentrically within said large rotating plug and rotatively supported from said large rotating plug, said intermediate rotating plug being rotated by a self locking drive system as claimed in claim 1, a small rotating plug disposed eccentrically within said intermediate rotating plug and rotatively supported from said intermediate rotating plug, and said small rotating plug being rotated by a self locking drive system including a worm gear set driving a pinion gear which drives the small rotating plug directly.

3. The self locking drive system in claim 1 wherein the mechanical means comprises:

a motor, a slip clutch which is mounted on the drive shaft of said motor, said slip clutch being provided for overtorque protection, and interconnecting mechanical means driving interconnecting said slip clutch to said worm.

4. The self locking drive system in claim 3 further comprising:

an encoder connected to either of said idler gears, a tachometer connected to said motor, electrical means for providing power to said motor, said means being connected to said encoder and said tachometer, whereby positive feedback information from said encoder and said tachometer is used by said electrical means for providing power to said motor to regulate the amount of power fed by said mechanical means to said motor and thereby drive and control the acceleration and positioning of said refueling plug.

* * * * *